US012668995B2

(12) United States Patent
Min et al.

(10) Patent No.: US 12,668,995 B2
(45) **Date of Patent: *Jun. 30, 2026**

(54) ANTI-IMPACT ROTATING TONGUE TYPE STORAGE DEVICE AND LOCK

(71) Applicant: Nanjing Easthouse Electrical Co., Ltd., Nanjing (CN)

(72) Inventors: Hao Min, Nanjing (CN); Kaojin Qian, Nanjing (CN); Fei Xian, Nanjing (CN)

(73) Assignee: Nanjing Easthouse Electrical Co., Ltd., Nanjing (CN)

( * ) Notice: Subject to any disclaimer, the term of this patent is extended or adjusted under 35 U.S.C. 154(b) by 134 days.

This patent is subject to a terminal disclaimer.

(21) Appl. No.: 18/404,933

(22) Filed: Jan. 5, 2024

(65) Prior Publication Data

US 2024/0229506 A1 Jul. 11, 2024

(30) Foreign Application Priority Data

Jan. 5, 2023 (CN) ........................ 202310012914.9

(51) Int. Cl.
*E05B 17/20* (2006.01)
*E05B 47/00* (2006.01)

(52) U.S. Cl.
CPC ...... *E05B 17/2092* (2013.01); *E05B 17/2088* (2013.01); *E05B 47/0004* (2013.01)

(58) Field of Classification Search
CPC ............. E05B 17/2092; E05B 17/2088; E05B 17/2034; E05B 17/2084; E05B 47/0004;
(Continued)

(56) References Cited

U.S. PATENT DOCUMENTS 1,976,274 A * 10/1934 Yanusko ................. E05B 67/36 70/9
2,325,225 A * 7/1943 Burke ................. E05B 47/0002 292/201

(Continued)

FOREIGN PATENT DOCUMENTS

CN 109236067 A * 1/2019 ......... E05B 47/0012
CN 110512963 A * 11/2019 ......... E05B 47/0012

(Continued)

*Primary Examiner* — Steven A Tullia
(74) *Attorney, Agent, or Firm* — Wiersch Law Group

(57) ABSTRACT

Provided is an anti-impact rotating tongue type storage device. The storage device includes: a box body; a locking mechanism arranged in the box body; and a lock body that selectively cooperates with or separates from the locking mechanism, the lock body includes: a lock shell that remains stationary relative to the locking mechanism in working state; a rotating tongue that selectively cooperates with or separates from the locking mechanism and rotates relative to the lock shell; a blocking assembly that selectively blocks or avoids the rotating tongue within rotation travel of the rotating tongue; an actuating assembly that selectively blocks avoidance of the blocking assembly at first position within avoidance travel of the blocking assembly; and a falling block assembly arranged at second position within the avoidance travel of the blocking assembly, that supplements blocking function of the actuating assembly when the lock shell is subjected to impact force.

16 Claims, 6 Drawing Sheets

(58) Field of Classification Search
CPC ............. E05B 47/0012; E05B 47/0603; E05B 47/0607; E05B 47/0001; E05B 47/06; E05B 47/0002; E05B 63/0013; E05B 65/0075; E05B 2047/0084; E05B 2047/0093; E05B 9/00; Y10T 292/1082
USPC ......................................... 70/278.1, 333, 416
See application file for complete search history.

(56) References Cited

U.S. PATENT DOCUMENTS

| | | | | | |
|---|---|---|---|---|---|
| 5,134,870 | A * | 8/1992 | Uyeda | E05B 47/0002 | 70/333 R |
| 6,076,870 | A * | 6/2000 | Frolov | E05B 47/0047 | 292/144 |
| 6,786,519 | B2 * | 9/2004 | Gartner | E05B 47/0603 | 292/195 |
| 6,874,830 | B2 * | 4/2005 | Bashford | E05B 47/0047 | 292/DIG. 60 |
| 7,461,872 | B2 * | 12/2008 | Moon | E05B 17/2092 | 292/109 |
| 7,770,944 | B2 * | 8/2010 | Yuan | E05B 47/06 | 292/195 |
| 8,261,586 | B2 * | 9/2012 | Gartner | E05B 63/0017 | 292/201 |
| 8,826,709 | B2 * | 9/2014 | Dehaven | E05B 65/0082 | 70/333 R |
| 9,458,647 | B2 * | 10/2016 | Gartner | E05B 47/0607 | |
| 9,657,500 | B2 * | 5/2017 | Min | E05C 3/00 | |
| 9,845,618 | B2 * | 12/2017 | Worm | E05B 47/06 | |
| 9,903,137 | B2 * | 2/2018 | Min | E05B 17/2034 | |
| 10,145,156 | B2 * | 12/2018 | Aker | E05C 3/124 | |
| 2008/0073916 | A1 * | 3/2008 | Min | E05B 47/0603 | 292/201 |
| 2008/0314100 | A1 * | 12/2008 | Min | E05B 47/0012 | 70/278.1 |
| 2024/0229506 | A1 * | 7/2024 | Min | E05B 47/0012 | |

FOREIGN PATENT DOCUMENTS

| | | | | | |
|---|---|---|---|---|---|
| CN | 110700698 | A * | 1/2020 | E05B 15/10 |
| CN | 211229882 | U * | 8/2020 | E05B 65/00 |
| CN | 211874190 | U * | 11/2020 | E05B 71/00 |
| CN | 112482900 | A * | 3/2021 | E05B 15/04 |
| CN | 113137140 | A * | 7/2021 | E05B 47/0012 |
| CN | 215168900 | U * | 12/2021 | E05B 47/00 |
| CN | 114458102 | A * | 5/2022 | E05B 65/0075 |
| DE | 112018007814 | T5 * | 4/2021 | E05B 63/16 |
| EP | 0634552 | A1 * | 1/1995 | E05C 9/1875 |
| EP | 2495379 | A1 * | 9/2012 | E05B 63/0013 |
| KR | 20090013165 | U * | 12/2009 | E05B 47/06 |
| WO | WO-03040457 | A1 * | 5/2003 | D06F 37/42 |
| WO | WO-2017129158 | A1 * | 8/2017 | E05B 47/0607 |

* cited by examiner

ANTI-IMPACT ROTATING TONGUE TYPE STORAGE DEVICE AND LOCK

CROSS-REFERENCE TO RELATED APPLICATION

The present application claims priority to Chinese Patent Application No. 202310012914.9, filed on Jan. 5, 2023, the content of which is incorporated herein by reference in its entirety.

TECHNICAL FIELD

The present disclosure relates to the field of safety protection technologies, in particular to an anti-impact rotating tongue type storage device and lock.

BACKGROUND

At present, safeties of bank safes, vault doors, jewelry storage cabinets, police or military firearm cabinets, firearm boxes, and the like are strictly required. The safety industry has adopted electronic locks and high-tech measures such as fingerprints, vein prints, and voiceprints to restrict invalid users' use.

In a process of implementing existing technologies, the inventor found:

In order to ensure the safety of a storage device, decryption to obtain authorization needs to be prevented, and the mechanical strength of the storage device and the mechanical strength of a lock combined with other portions of the storage device still need to be improved.

When the lock or other portions of the storage device are subjected to an impact force, the impact force converted from an impact momentum easily leads to damage to the storage device or falling of the lock of the storage device.

Therefore, it is necessary to provide a technical solution to prevent impact damage.

SUMMARY

Embodiments of the present disclosure provide a technical solution to prevent impact damage, so as to solve the technical problem of low safety.

Specifically, an anti-impact rotating tongue type storage device includes: a box body; a locking mechanism arranged in the box body; and a lock body that selectively cooperates with or separates from the locking mechanism. The lock body includes: a lock shell that remains stationary relative to the locking mechanism in a working state; a rotating tongue that selectively cooperates with or separates from the locking mechanism and rotates relative to the lock shell; a blocking assembly that selectively blocks or avoids the rotating tongue within a rotation travel of the rotating tongue; an actuating assembly that selectively blocks the avoidance of the blocking assembly at a first position within an avoidance travel of the blocking assembly; and a falling block assembly arranged at a second position different from the first position within the avoidance travel of the blocking assembly, that supplements a blocking function of the actuating assembly when the lock shell is subjected to an impact force.

Further, the falling block assembly includes a head, a rod portion extending from the head, and a reset member that surrounds the rod portion and presses against the head.

Further, the blocking assembly has an end surface facing the rod portion; the end surface is inclined relative to the rod portion; and when the head moves towards the blocking assembly, a distance between the rod portion and the end surface is reduced.

Further, the falling block assembly is distributed on a first side of the blocking assembly; and the actuating assembly is distributed on an opposite side, opposite to the first side, of the blocking assembly.

Further, an angle from the rod portion to the blocking assembly is greater than 90 degrees.

Further, a side of the rotating tongue is buckled inwards in an arc shape to form a hook portion; an arc-shaped groove is formed on a side of the hook portion, and the hook portion is provided with an opposite side, opposite to the arc-shaped groove, to form an unloading surface facing the blocking assembly; and the blocking assembly is provided with a lap surface corresponding to the unloading surface.

Further, the lock body further includes a compression assembly; the blocking assembly is provided with a sliding groove; and the compression assembly presses against the sliding groove.

Further, the actuating assembly includes: a motor body; and a shaft body that selectively blocks the avoidance of the blocking assembly under the driving of the motor body.

Further, the actuating assembly includes: an electromagnetic field body; and a core body that selectively blocks the avoidance of the blocking assembly under the driving of the electromagnetic field body.

The present disclosure further provides an anti-impact rotating tongue type lock body, including: a lock shell; a rotating tongue that rotates relative to the lock shell; a blocking assembly that selectively blocks or avoids the rotating tongue within a rotation travel of the rotating tongue; an actuating assembly that selectively blocks the avoidance of the blocking assembly at a first position within an avoidance travel of the blocking assembly; and a falling block assembly arranged at a second position different from the first position within the avoidance travel of the blocking assembly, that supplements a blocking function of the actuating assembly when the lock shell is subjected to an impact force.

Further, the falling block assembly includes a head, a rod portion extending from the head, and a reset member that surrounds the rod portion and presses against the head.

Further, the blocking assembly has an end surface facing the rod portion; the end surface is inclined relative to the rod portion; and when the head moves towards the blocking assembly, a distance between the rod portion and the end surface is reduced.

Further, the falling block assembly is distributed on a first side of the blocking assembly; and the actuating assembly is distributed on an opposite side, opposite to the first side, of the blocking assembly.

Further, an angle from the rod portion to the blocking assembly is greater than 90 degrees.

Further, a side of the rotating tongue is buckled inwards in an arc shape to form a hook portion; an arc-shaped groove is formed on a side of the hook portion, and the hook portion is provided with an opposite side, opposite to the arc-shaped groove, to form an unloading surface facing the blocking assembly; and the blocking assembly is provided with a lap surface corresponding to the unloading surface.

Further, the lock body further includes a compression assembly; the blocking assembly is provided with a sliding groove; and the compression assembly presses against the sliding groove.

Further, the actuating assembly includes: a motor body; and a shaft body that selectively blocks the avoidance of the blocking assembly under the driving of the motor body.

Further, the actuating assembly includes: an electromagnetic field body; and a core body that selectively blocks the avoidance of the blocking assembly under the driving of the electromagnetic field body.

The technical solutions provided in the embodiments of the present disclosure have at least the following beneficial effects:

When the lock shell is subjected to an impact force, the falling block assembly supplements the blocking function of the actuating assembly, thereby resisting impact damage and improving the safety of the anti-impact rotating tongue type lock body.

BRIEF DESCRIPTION OF DRAWINGS

The accompanying drawings described here are used for providing a further understanding of the present disclosure, and constitute a part of the present disclosure. The schematic embodiments of the present disclosure and the descriptions thereof are used for interpreting the present disclosure, rather than constituting improper limitations to the present disclosure. In the accompanying drawings.

REFERENCE SIGNS

Figure 1:
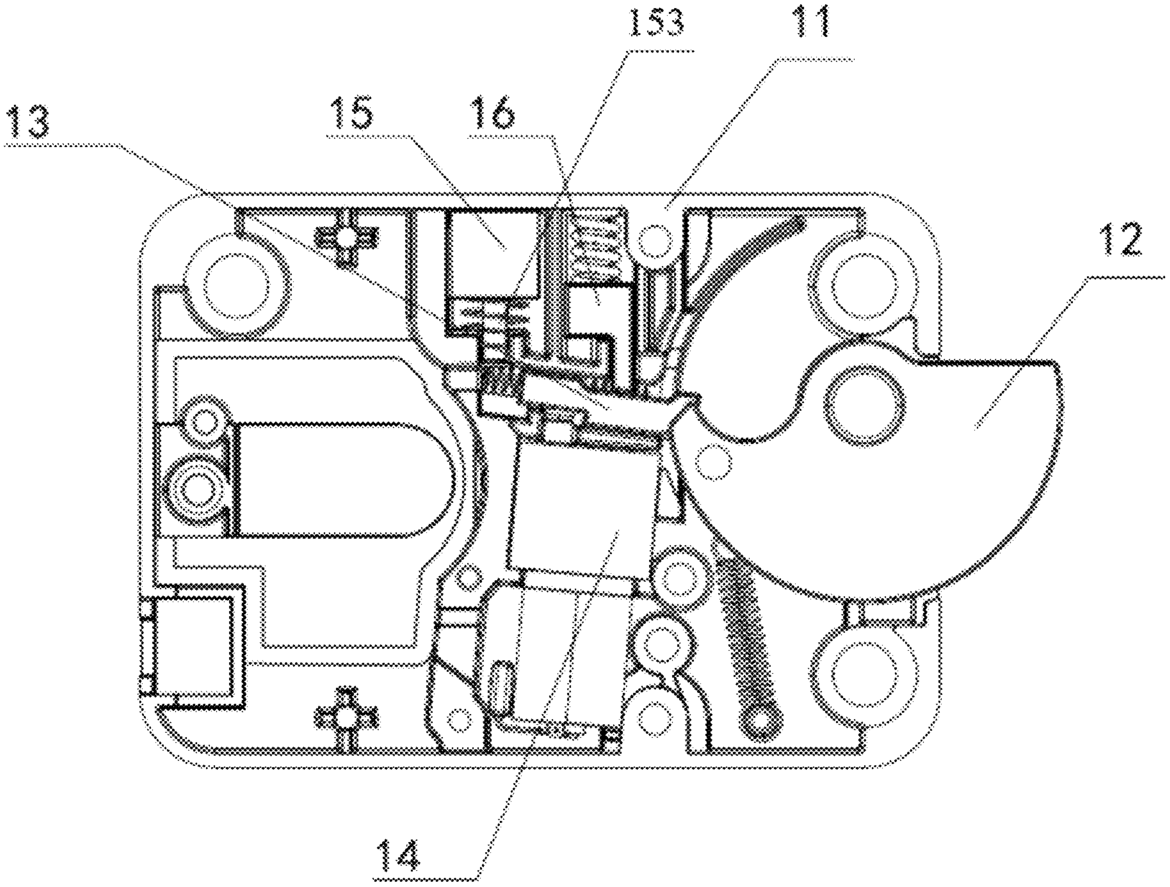
FIG. 1 is a schematic structural diagram of an anti-impact rotating tongue type lock body provided in an embodiment of the present disclosure.

100 lock body
11 lock shell
12 rotating tongue
121 unloading surface
122 hook portion
123 arc-shaped groove
13 blocking assembly
131 end surface
132 lap surface
133 sliding groove
14 actuating assembly
141 motor shaft
142 shaft body
143 elastic body
144 clamp pin
145 core body
146 motor body
147 electromagnetic field body
15 falling block assembly
151 head
152 rod portion
153 reset member
16 compression assembly
200 box body
300 locking mechanism

DETAILED DESCRIPTION

To make the objectives, technical solutions, and advantages of the present disclosure clearer, the technical solutions of the present disclosure will be clearly and completely described below in conjunction with the specific embodiments of the present disclosure and the corresponding accompanying drawings. Obviously, the described embodiments are only some but not all of the embodiments of the present disclosure. All other embodiments obtained by those of ordinary skill in the art based on the embodiments of the present disclosure without any creative efforts fall within the scope of protection of the present disclosure.

Figure 2:
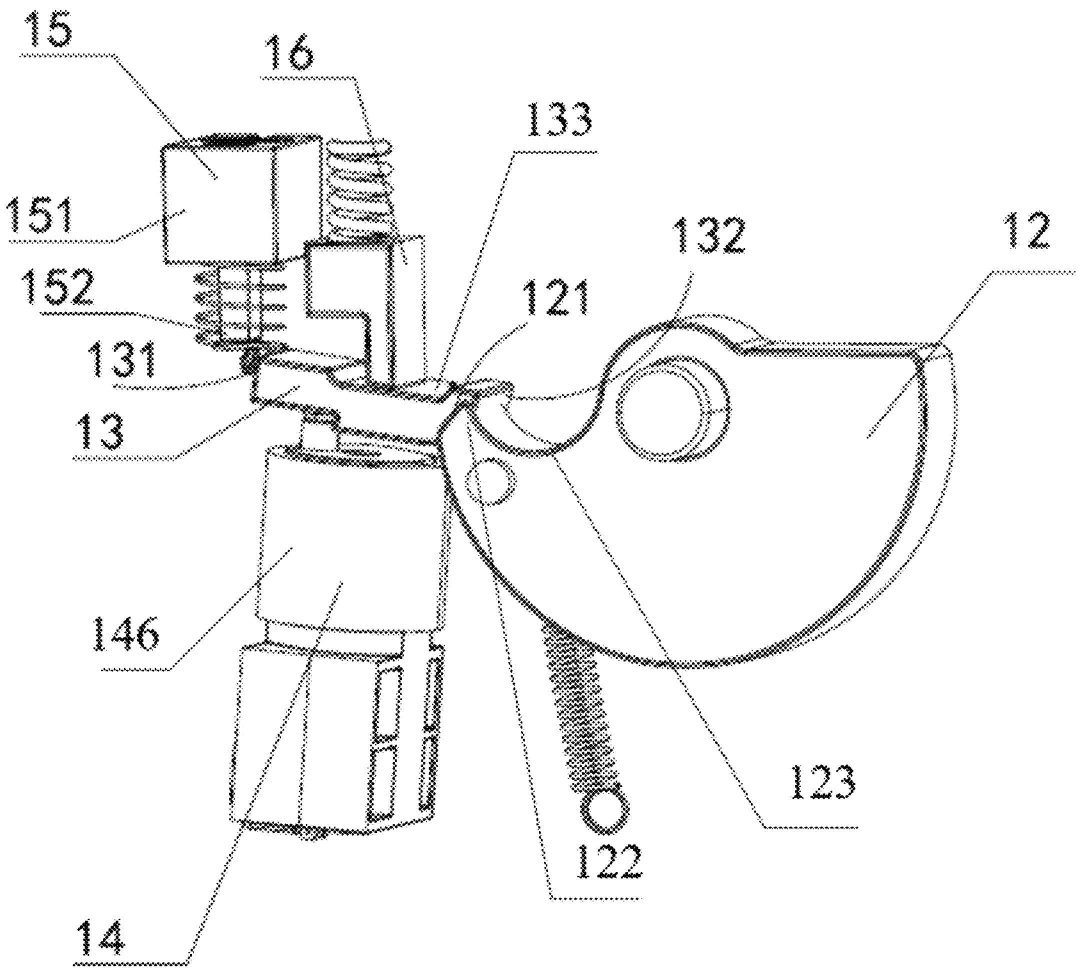
FIG. 2 is a partial structural diagram of the anti-impact type tongue type lock body provided in an embodiment of the present disclosure.
Figure 3:
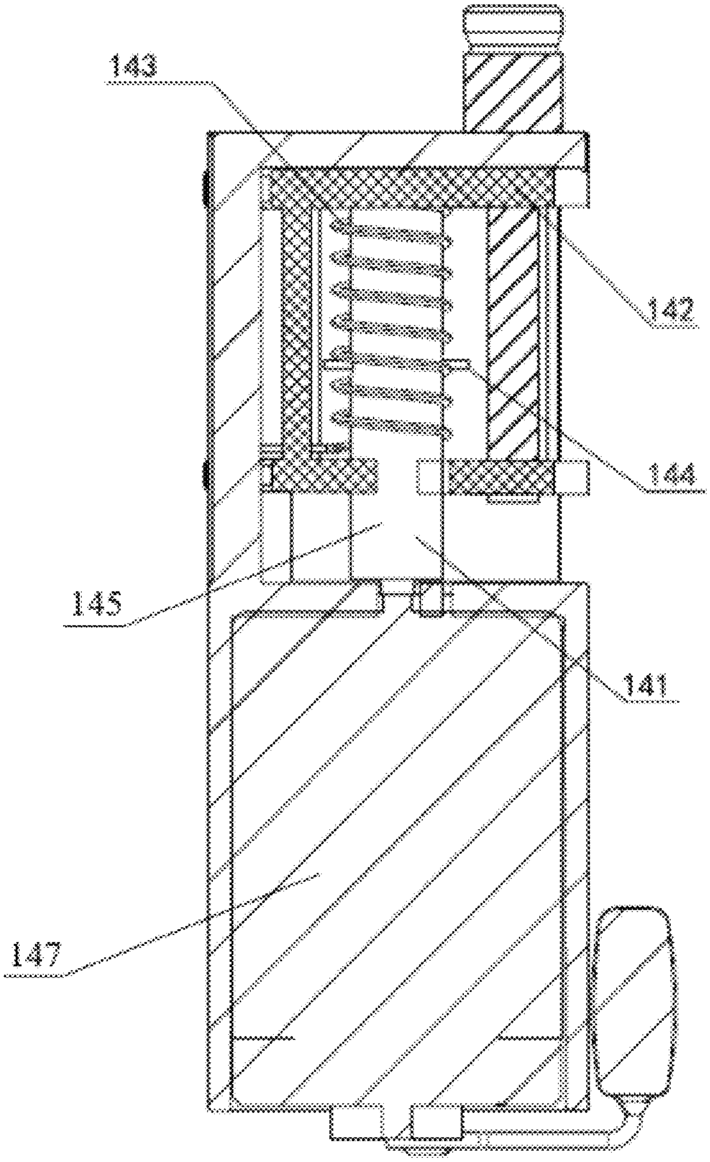
FIG. 3 is a cross-sectional view of an actuating assembly provided in an embodiment of the present disclosure.
Figure 6:
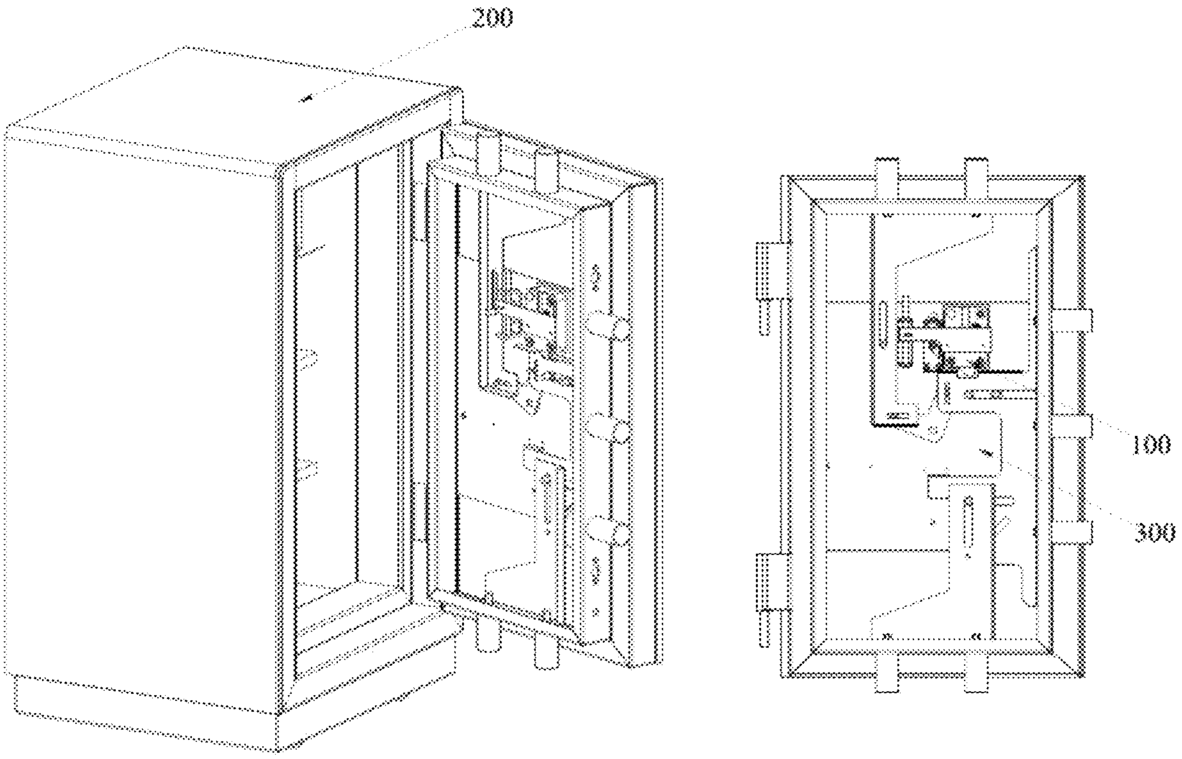
FIG. 6 is a schematic diagram showing a box body and locking mechanism arranged in the box body in an embodiment of the present disclosure.

With reference to FIG. 1 to FIG. 3, the present disclosure provides an anti-impact rotating tongue type storage device, including: a box body 200 (shown in FIG. 6); a locking mechanism 300 (also shown in FIG. 6) arranged in the box body 200; and a lock body 100 that selectively cooperates with or separates from the locking mechanism 300. The lock body 100 includes: a lock shell 11 that remains stationary relative to the locking mechanism 300 in a working state; a rotating tongue 12 that selectively cooperates with or separates from the locking mechanism 300 and rotates relative to the lock shell 11; a blocking assembly 13 that selectively blocks or avoids the rotating tongue 12 within a rotation travel of the rotating tongue 12; an actuating assembly 14 that selectively blocks the avoidance of the blocking assembly 13 at a first position within an avoidance travel of the blocking assembly 13; and a falling block assembly 15 arranged at a second position different from the first position within the avoidance travel of the blocking assembly 13, that supplements a blocking function of the actuating assembly 14 when the lock shell 11 is subjected to an impact force.

The anti-impact rotating tongue type storage device is an imprecise description of an item storage device or apparatus. The anti-impact rotating tongue type storage device is mainly used for storing and facilitating the movement of items in terms of its function. The "box" illustrated or exemplified here is also a universal device or apparatus used for the convenience of description to store items. The anti-impact rotating tongue type storage device may be a box, a can, or other irregularly shaped storage devices in specific implementation forms. It is easy to understand that the "box" here does not constitute a substantive limitation on the scope of protection of the present disclosure.

The box body 200 may be understood as a main body of the anti-impact rotating tongue type storage device. The "main body" here refers to a proportion of space occupied in the anti-impact rotating tongue type storage device, and does not contain any value comparison with other portions of the anti-impact rotating tongue type storage device. The box body 200 is mainly used for defining or enclosing a storage space for storing items. In a specific implementation form provided in the present disclosure, the overall box body 200 is usually in a shape of a flat box that is easy to carry or move. The material used for the box body 200 is usually hard alloy or other hard materials that are difficult to be violently damaged to protect valuable items inside. The box body 200 may usually be formed as a whole to improve strength and hardness and prevent violent damage.

The locking mechanism 300 is arranged in the box body 200. The locking mechanism 300 is mainly used for keeping the box body 200 in a closed state. The locking mechanism 300 may be integrally arranged in the box body 200 or integrally formed with the box body 200. Alternatively, the locking mechanism 300 may be fixedly connected to the box body 200. For example, the locking mechanism 300 may be welded to the locking mechanism 300. Generally, in order to maintain the strength of closure of the box body 200 or increase the violent strength required for violently dismantling the closed box body 200, the locking mechanism 300 may also be made of hard alloy or other hard materials.

The lock body 100 selectively cooperates with or separates from the locking mechanism 300 to close or open the box body 200. The "selectively" here may be understood as an operation of closing or opening the anti-impact rotating tongue type storage device by an operator according to user needs.

The lock body 100 includes: a lock shell 11 that remains stationary relative to the locking mechanism 300 in a working state; a rotating tongue 12 that selectively cooperates with or separates from the locking mechanism 300 and rotates relative to the lock shell 11; a blocking assembly 13 that selectively blocks or avoids the rotating tongue 12 within a rotation travel of the rotating tongue 12; an actuating assembly 14 that selectively blocks the avoidance of the blocking assembly 13 at a first position within an avoidance travel of the blocking assembly 13; and a falling block assembly 15 arranged at a second position different from the first position within the avoidance travel of the blocking assembly 13, that supplements a blocking function of the actuating assembly 14 when the lock shell 11 is subjected to an impact force.

The lock shell 11 remains stationary relative to the locking mechanism 300 in the working state. The lock shell 11 may be integrally formed with the box body 200. The lock shell 11 may alternatively be fixed to the box body 200. Specifically, the lock shell 11 may be fixed to the box body 200 by welding, riveting, or thread fitting.

The rotating tongue 12 moves relative to the lock shell 11, thereby switching the cooperating or separating state between the lock body 100 and the locking mechanism 300. The rotating tongue 12 is generally semi-circular, with one end in a ¼ arc shape and the other end in a ¼ arc with a groove in the middle. A pivot shaft is arranged in the middle of the rotating tongue 12, and may be caught into the lock shell 11 and rotate relative to the lock shell 11. In a first state, a portion of the rotating tongue 12 is inserted into the locking mechanism 300 to cooperate with the locking mechanism 300. In a second state, the rotating tongue 12 retracts the lock shell 11 to separate from the locking mechanism 300. The rotating tongue 12 is further provided with a positioning pin. The lock body 100 further includes a reset member. One end of the reset member is fixed to the lock shell 11, and the other end is fixed to the positioning pin. When the operator applies force under normal conditions, the rotating tongue 12 rotates relative to the lock shell 11. When the operating force is eliminated, the reset member pulls the rotating tongue 12 to reset. The reset member here may be a curved spring. After stretching, the curved spring resets to form a restoring force.

The blocking assembly 13 selectively blocks or avoids the rotating tongue 12 within the rotation travel of the rotating tongue 12. The blocking assembly 13 includes a slider and a reset member pressing against the slider. A guide groove that guides the blocking assembly 13 to move is arranged in the lock shell 11. For the sake of compact structure, the slider here is strip-shaped. The reset member here may be a curved spring. After compressed, the curved spring resets to form a restoring force. The rotating tongue 12 rotates to push the slider to move. The slider yields to complete the rotation travel of the rotating tongue 12. After the force for driving the rotating tongue 12 to rotate disappears, the slider presses against the rotating tongue 12 under the action of the reset member to maintain the combining state of the rotating tongue 12 and the locking mechanism 300.

The actuating assembly 14 selectively blocks the avoidance of the blocking assembly 13 at the first position within the avoidance travel of the blocking assembly 13. In specific embodiments provided in the present disclosure, the actuating assembly 14 is an electrically controlled assembly. The actuating assembly 14 is electrically controlled to feed and retract according to user's permissions. When the actuating assembly 14 is fed, the avoidance of the blocking assembly 13 is limited and fails. When the actuating assembly 14 retracts, the limitation on the blocking assembly 13 is eliminated, and the blocking assembly 13 can freely avoid, so that the rotating tongue 12 can rotate under the action of the driving force.

The falling block assembly 15 is arranged at the second position different from the first position within the avoidance travel of the blocking assembly 13, and supplements the blocking function of the actuating assembly 14 when the lock shell 11 is subjected to an impact force.

In the embodiments provided in the present disclosure, in order to reduce the complexity of the anti-impact structure and make reasonable use of space, the actuating assembly 14 selectively blocks the avoidance of the blocking assembly 13 at the first position within the avoidance travel of the blocking assembly 13, and the falling block assembly 15 supplements the blocking function at the second position. When the lock body 100 is subjected to a destructive impact force, the actuating assembly 14 retracts as a critical component. The falling block assembly 15 moves towards the blocking assembly 13 under the action of the destructive impact force. In this case, the timely supplement of the falling block assembly 15 can prevent failure of the lock body 100 under the action of the destructive impact force. In a brief pause process of the destructive impact force, the actuating assembly 14 automatically resets. Moreover, the falling block assembly 15 also resets.

In addition, the first position is roughly located in the middle of the slider of the blocking assembly 13. The second position is roughly located at one end of the slider of the blocking assembly 13. This can tolerate a large movement travel of the falling block assembly 15. The slider deflects under the action of the guide groove limiting the blocking assembly 13 inside the lock shell 11 after receiving a force, without continuing to transmit the impact force to the rotating tongue 12, so that the overall structure is less prone to failure.

Further, in a specific embodiment provided in the present disclosure, the falling block assembly 15 includes a head 151, a rod portion 152 extending from the head 151, and a reset member 153 that surrounds the rod portion 152 and presses against the head 151.

The head 151 of the falling block assembly 15 has a relatively large size or force area, which can effectively support the lock shell 11. The head 151 or the rod portion 152 may undertake the supplement function. In the present disclosure, in order to make the structure compact and small, the rod portion 152 undertakes the supplement function. This is because the cross-section of the rod portion 152 is smaller than that of the head 151. The reset member 153 resets the head 151 and the rod portion 152 in a brief pause process of destructive impact force. The reset member 153 here may be a curved spring. The curved spring surrounds the rod portion 152, one end of the curved spring presses against the head 151 and the other end presses against the lock shell 11. Meanwhile, the rod portion 152 and the blocking assembly 13 are spatially on different planes, or the rod portion 152 and the reset member 153 of the blocking assembly 13 spatially cross, to avoid mutual interference.

Further, in another specific embodiment provided in the present disclosure, the blocking assembly 13 has an end surface 131 facing the rod portion 152; the end surface is inclined relative to the rod portion 152; and when the head portion 151 moves towards the blocking assembly 13, a distance between the rod portion 152 and the end surface is reduced.

The slider of the blocking assembly 13 has the end surface 131 facing the rod portion 152. The end surface 131 is inclined relative to the rod portion 152. When the head portion 151 moves towards the blocking assembly 13, the distance between the rod portion 152 and the end surface 131 is reduced. That is, the larger the destructive impact force, the shorter the distance between the rod portion 152 and the end surface 131, the more significant the supplement function, and the more limited the avoidance of the blocking assembly 13.

Further, in another specific embodiment provided in the present disclosure, the falling block assembly 15 is distributed on a first side of the blocking assembly 13;

The actuating assembly 14 is distributed on an opposite side, opposite to the first side, of the blocking assembly 13.

The falling block assembly 15 is distributed on the first side of the blocking assembly 13. The actuating assembly 14 is distributed on the opposite side, opposite to the first side, of the blocking assembly 13. In this case, spaces on two sides of the actuating assembly 14 are reasonably utilized, so that the lock body 100 can be miniaturized and compact. The slider deflects under the action of the guide groove limiting the blocking assembly 13 inside the lock shell 11 after receiving a force, which further reduces the impact on the actuating assembly 14.

Further, in another specific embodiment provided in the present disclosure, an angle from the rod portion 152 to the blocking assembly 13 is greater than 90 degrees.

The angle from the rod portion 152 to the blocking assembly 13 is greater than 90 degrees, which enables the falling block assembly 15 to effectively bear a destructive impact force and to provide some preset deflection travel for the slider when the impact force is too large, so as to prevent overall failure of the lock body 100.

Further, in another specific embodiment provided in the present disclosure, a side of the rotating tongue 12 is buckled inwards in an arc shape to form a hook portion 122;

An arc-shaped groove 123 is formed on a side of the hook portion 122, and the hook portion 122 is provided with an opposite side, opposite to the arc-shaped groove 123, to form an unloading surface 121 facing the blocking assembly 13;

The blocking assembly 13 is provided with a lap surface 132 corresponding to the unloading surface 121.

A side of the rotating tongue 12 is buckled inwards in an arc shape to form the hook portion 122. Alternatively, a radius of the rotating tongue 12 at a tail end decreases to form the hook portion 122. The arc-shaped groove 123 is formed on a side of the hook portion 122. The hook portion 122 is provided with an opposite side, opposite to the arc-shaped groove 123, to form an unloading surface 121 facing the blocking assembly 13. It can be understood as the hook portion 122 or an outer surface of the rotating tongue 12 is convex to have an unloading function. The blocking assembly 13 is provided with the lap surface 132 corresponding to the unloading surface 121. The arrangement of the blocking assembly 13 and the rotating tongue 12 in this way not only facilitates removal of impact force, but also facilitates avoidance of the blocking assembly 13 when the rotating tongue 12 moves normally.

Further, in another specific embodiment provided in the present disclosure, the lock body 100 further includes a compression assembly 16; the blocking assembly 13 is provided with a sliding groove 133; the compression assembly 16 presses against the sliding groove 133.

The compression assembly 16 includes an ejector block that ejects the blocking assembly 13 and a compression member that applies a compression force to the ejector block. The compression member here may be a compression spring. In this case, even if a gap between the guide groove of the lock shell 11 and the blocking assembly 13 is slightly large, the compression assembly 16 can maintain the limited position of the blocking assembly 13 relative to the lock shell 11. The blocking assembly 13 is provided with the sliding groove 133. The compression assembly 16 presses against the sliding groove 133. In this case, when the blocking assembly 13 deflects under the impact force, the compression assembly 16 can provide a reverse compression force. In addition, a side of the compression member of the compression assembly 16 further presses against the lock shell 11, so as to provide support for the external impact force corresponding to the lock shell 11 and maintain the overall lock body 100 less prone to failure.

Further, in another specific embodiment provided in the present disclosure, the actuating assembly 14 includes: a motor body 146; and a shaft body 142 that selectively blocks the avoidance of the blocking assembly 13 under the driving of the motor body 146.

With reference to FIG. 3, the motor body 146 includes a motor shaft 141, a shaft body 142 sleeved on the motor shaft 141, an elastic body 143 arranged between the motor shaft 141 and the shaft body 142, and a clamp pin 144 arranged on the motor shaft 141. The clamp pin 144 can rotate synchronously with the motor shaft 141 to compress the elastic body 143, so as to drive the shaft body 142 to move. When the motor shaft 141 is fed and rotates, the clamp pin 144 is driven to rotate and compress the elastic body 143 on a side facing the blocking assembly 13, so as to drive the shaft body 142 to move towards the blocking assembly 13. When the motor shaft 141 retracts and rotates, the clamp pin 144 is driven to rotate and compress the elastic body 143 on a side away from the blocking assembly 13, so as to drive the shaft body 142 to move away from the blocking assembly 13 and allow the avoidance of the blocking assembly 13.

Further, in another specific embodiment provided in the present disclosure, the actuating assembly 14 includes: an electromagnetic field body 147; and a core body 145 that selectively blocks the avoidance of the blocking assembly 13 under the driving of the electromagnetic field body 147.

Figure 4:
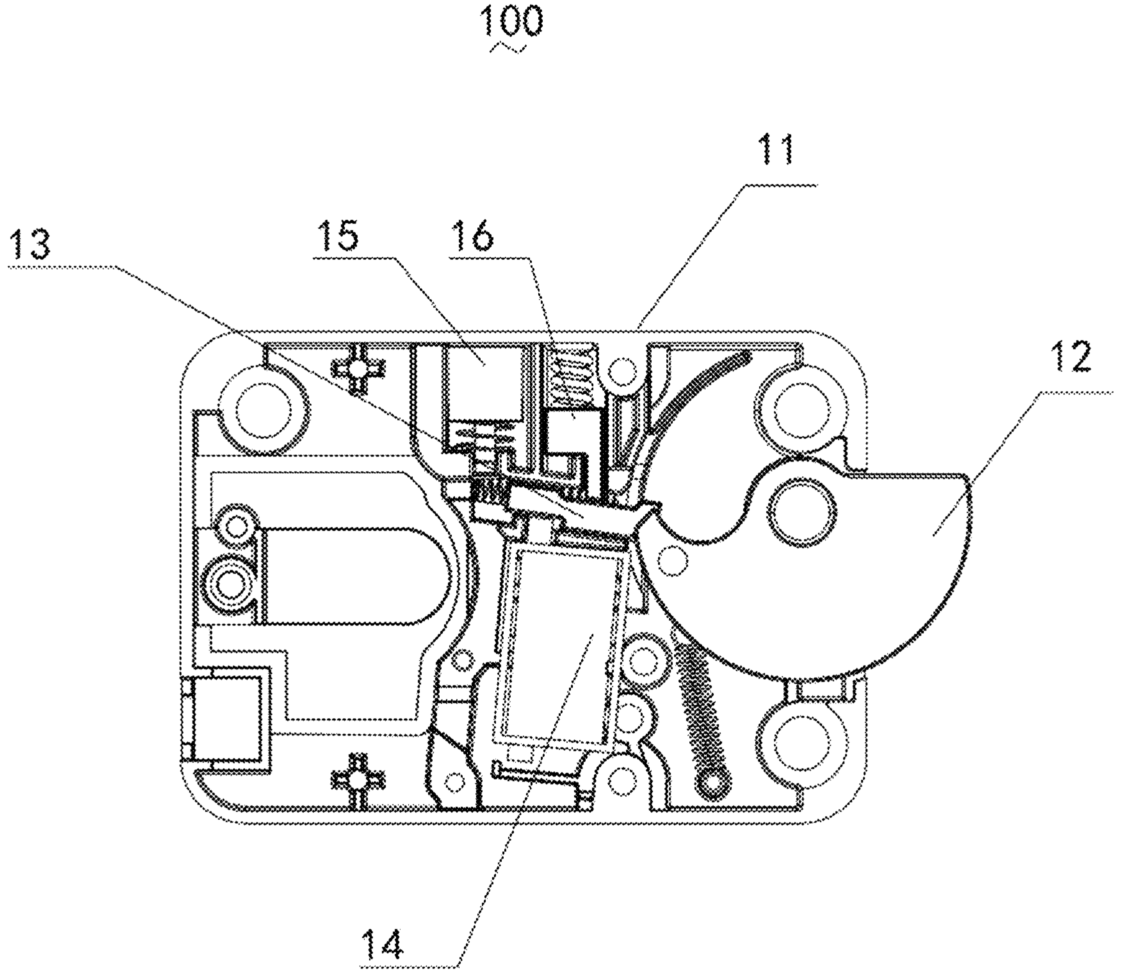
FIG. 4 is a schematic structural diagram of another anti-impact rotating tongue type lock body provided in an embodiment of the present disclosure.
Figure 5:
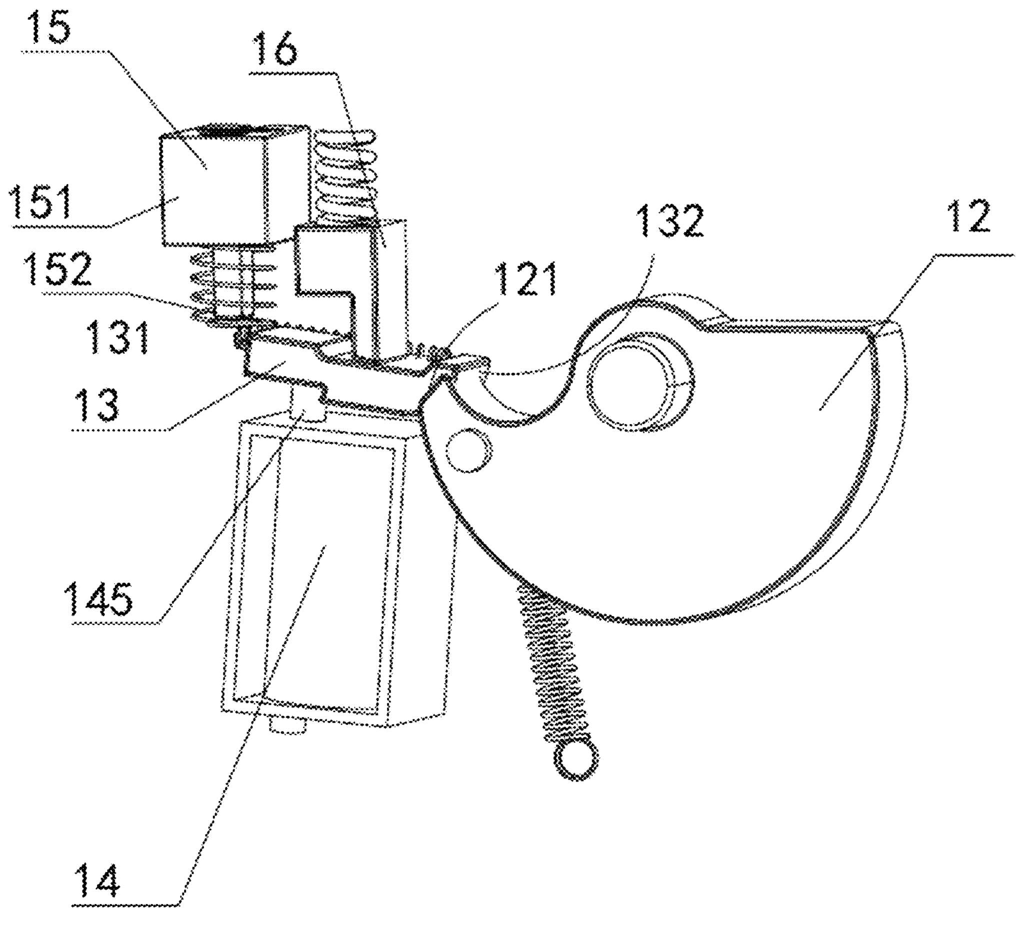
FIG. 5 is a partial structural diagram of another anti-impact rotating tongue type lock body provided in an embodiment of the present disclosure.

With reference to FIG. 4 and FIG. 5, the electromagnetic field body 147 includes a magnet, a wound coil, and a core body 145 that is magnetized under the energized wound coil and interacts with the magnet in a magnetic field. The core body 145 blocks the avoidance of the blocking assembly 13 when not magnetized. After magnetized in the electromagnetic field, the core body retreats under the action of the magnet to facilitate the avoidance of the blocking assembly 13.

The above describes the anti-impact rotating tongue type storage device provided in the present disclosure. A corresponding lock body 100 is described below.

An anti-impact rotating tongue 12 type lock body 100 includes: a lock shell 11; a rotating tongue 12 that rotates relative to the lock shell 11; a blocking assembly 13 that selectively blocks or avoids the rotating tongue 12 within a rotation travel of the rotating tongue 12; an actuating assembly 14 that selectively blocks the avoidance of the blocking assembly 13 at a first position within an avoidance travel of the blocking assembly 13; and a falling block assembly 15 arranged at a second position different from the first position within the avoidance travel of the blocking assembly 13, that supplements a blocking function of the actuating assembly 14 when the lock shell 11 is subjected to an impact force.

In some embodiments of the lock body 100 for a box body 200 provided in the present disclosure, the lock shell 11 remains stationary relative to a locking mechanism 300 in a working state. The lock shell 11 may be integrally formed with the box body 200. The lock shell 11 may alternatively be fixed to the box body 200. Specifically, the lock shell 11 may be fixed to the box body 200 by welding, riveting, or thread fitting. The box body 200 here may be a bank safe, a jewelry storage cabinet, a police or military firearm cabinet, a firearm box, or another similar device in other embodiments.

The lock body 100 of the present disclosure may be mounted on a door or window. The door or window may be reflected as a door or a window in some embodiments. The door may be a vault door or a physical space that requires control over access to space, such as various secret rooms. The window may be understood as a portion of a physical space that can be opened, such as a window of a physical space. The lock shell 11 is mounted on the door or window. The locking structure is mounted on a frame of the corresponding door or window.

The rotating tongue 12 moves relative to the lock shell 11, thereby switching the cooperating or separating state between the lock body 100 and the locking mechanism 300. The rotating tongue 12 is generally semi-circular, with one end in a ¼ arc shape and the other end in a ¼ arc with a groove in the middle. A pivot shaft is arranged in the middle of the rotating tongue 12, and may be caught into the lock shell 11 and rotate relative to the lock shell 11. In a first state, a portion of the rotating tongue 12 is inserted into the locking mechanism 300 to cooperate with the locking mechanism 300. In a second state, the rotating tongue 12 retracts the lock shell 11 to separate from the locking mechanism 300. The rotating tongue 12 is further provided with a positioning pin. The lock body 100 further includes a reset member. One end of the reset member is fixed to the lock shell 11, and the other end is fixed to the positioning pin. When the operator applies force under normal conditions, the rotating tongue 12 rotates relative to the lock shell 11. When the operating force is eliminated, the reset member pulls the rotating tongue 12 to reset. The reset member here may be a curved spring. After stretching, the curved spring resets to form a restoring force.

The blocking assembly 13 selectively blocks or avoids the rotating tongue 12 within the rotation travel of the rotating tongue 12. The blocking assembly 13 includes a slider and a reset member pressing against the slider. A guide groove that guides the blocking assembly 13 to move is arranged in the lock shell 11. For the sake of compact structure, the slider here is strip-shaped. The reset member here may be a curved spring. After compressed, the curved spring resets to form a restoring force. The rotating tongue 12 rotates to push the slider to move. The slider yields to complete the rotation travel of the rotating tongue 12. After the force for driving the rotating tongue 12 to rotate disappears, the slider presses against the rotating tongue 12 under the action of the reset member to maintain the combining state of the rotating tongue 12 and the locking mechanism 300.

The actuating assembly 14 selectively blocks the avoidance of the blocking assembly 13 at the first position within the avoidance travel of the blocking assembly 13. In specific embodiments provided in the present disclosure, the actuating assembly 14 is an electrically controlled assembly. The actuating assembly 14 is electrically controlled to feed and retract according to user's permissions. When the actuating assembly 14 is fed, the avoidance of the blocking assembly 13 is limited and fails. When the actuating assembly 14 retracts, the limitation on the blocking assembly 13 is eliminated, and the blocking assembly 13 can freely avoid, so that the rotating tongue 12 can rotate under the action of the driving force.

The falling block assembly 15 is arranged at the second position different from the first position within the avoidance travel of the blocking assembly 13, and supplements the blocking function of the actuating assembly 14 when the lock shell 11 is subjected to an impact force.

In the embodiments provided in the present disclosure, in order to reduce the complexity of the anti-impact structure and make reasonable use of space, the actuating assembly 14 selectively blocks the avoidance of the blocking assembly 13 at the first position within the avoidance travel of the blocking assembly 13, and the falling block assembly 15 supplements the blocking function at the second position. When the lock body 100 is subjected to a destructive impact force, the actuating assembly 14 retracts as a critical component. The falling block assembly 15 moves towards the blocking assembly 13 under the action of the destructive impact force. In this case, the timely supplement of the falling block assembly 15 can prevent failure of the lock body 100 under the action of the destructive impact force. In a brief pause process of the destructive impact force, the actuating assembly 14 automatically resets. Moreover, the falling block assembly 15 also resets.

In addition, the first position is roughly located in the middle of the slider of the blocking assembly 13. The second position is roughly located at one end of the slider of the blocking assembly 13. This can tolerate a large movement travel of the falling block assembly 15. The slider deflects under the action of the guide groove limiting the blocking assembly 13 inside the lock shell 11 after receiving a force, without continuing to transmit the impact force to the rotating tongue 12, so that the overall structure is less prone to failure.

Further, in another specific embodiment provided in the present disclosure, the falling block assembly 15 includes a head 151, a rod portion 152 extending from the head 151, and a reset member 153 that surrounds the rod portion 152 and presses against the head 151.

The head 151 of the falling block assembly 15 has a relatively large size or force area, which can effectively support the lock shell 11. The head 151 or the rod portion 152 may undertake the supplement function. In the present disclosure, in order to make the structure compact and small, the rod portion 152 undertakes the supplement function. This is because the cross-section of the rod portion 152 is smaller than that of the head 151. The reset member 153 resets the head 151 and the rod portion 152 in a brief pause process of destructive impact force. The reset member 153 here may be a curved spring. The curved spring surrounds the rod portion 152, one end of the curved spring presses against the head 151 and the other end presses against the lock shell 11. Meanwhile, the rod portion 152 and the blocking assembly 13 are spatially on different planes, or the rod portion 152 and the reset member 153 of the blocking assembly 13 spatially cross, to avoid mutual interference.

Further, in another specific embodiment provided in the present disclosure, the blocking assembly 13 has an end surface 131 facing the rod portion 152; the end surface is inclined relative to the rod portion 152; and when the head portion 151 moves towards the blocking assembly 13, a distance between the rod portion 152 and the end surface 131 is reduced.

The slider of the blocking assembly 13 has the end surface 131 facing the rod portion 152. The end surface 131 is inclined relative to the rod portion 152. When the head portion 151 moves towards the blocking assembly 13, the distance between the rod portion 152 and the end surface 131 is reduced. That is, the larger the destructive impact force, the shorter the distance between the rod portion 152 and the end surface 131, the more significant the supplement function, and the more limited the avoidance of the blocking assembly 13.

Further, in another specific embodiment provided in the present disclosure, the falling block assembly 15 is distributed on a first side of the blocking assembly 13;

The actuating assembly 14 is distributed on an opposite side, opposite to the first side, of the blocking assembly 13.

The falling block assembly 15 is distributed on the first side of the blocking assembly 13. The actuating assembly 14 is distributed on the opposite side, opposite to the first side, of the blocking assembly 13. In this case, spaces on two sides of the actuating assembly 14 are reasonably utilized, so that the lock body 100 can be miniaturized and compact. The slider deflects under the action of the guide groove limiting the blocking assembly 13 inside the lock shell 11 after receiving a force, which further reduces the impact on the actuating assembly 14.

Further, in another specific embodiment provided in the present disclosure, an angle from the rod portion 152 to the blocking assembly 13 is greater than 90 degrees.

The angle from the rod portion 152 to the blocking assembly 13 is greater than 90 degrees, which enables the falling block assembly 15 to effectively bear a destructive impact force and to provide some preset deflection travel for the slider when the impact force is too large, so as to prevent overall failure of the lock body 100.

Further, in another specific embodiment provided in the present disclosure, a side of the rotating tongue 12 is buckled inwards in an arc shape to form a hook portion 122. An arc-shaped groove 123 is formed on a side of the hook portion 122, and the hook portion 122 is provided with an opposite side, opposite to the arc-shaped groove 123, to form an unloading surface 121 facing the blocking assembly 13. The blocking assembly 13 is provided with a lap surface 132 corresponding to the unloading surface 121.

A side of the rotating tongue 12 is buckled inwards in an arc shape to form the hook portion 122. Alternatively, a radius of the rotating tongue 12 at a tail end decreases to form the hook portion 122. The arc-shaped groove 123 is formed on a side of the hook portion 122. The hook portion 122 is provided with an opposite side, opposite to the arc-shaped groove 123, to form an unloading surface 121 facing the blocking assembly 13. It can be understood as the hook portion 122 or an outer surface of the rotating tongue 12 is convex to have an unloading function. The blocking assembly 13 is provided with the lap surface 132 corresponding to the unloading surface 121. The arrangement of the blocking assembly 13 and the rotating tongue 12 in this way not only facilitates removal of impact force, but also facilitates avoidance of the blocking assembly 13 when the rotating tongue 12 moves normally.

Further, in another specific embodiment provided in the present disclosure, the lock body 100 further includes a compression assembly 16. The blocking assembly 13 is provided with a sliding groove 133. The compression assembly 16 presses against the sliding groove 133.

The compression assembly 16 includes an ejector block that ejects the blocking assembly 13 and a compression member that applies a compression force to the ejector block. The compression member here may be a compression spring. In this case, even if a gap between the guide groove of the lock shell 11 and the blocking assembly 13 is slightly large, the compression assembly 16 can maintain the limited position of the blocking assembly 13 relative to the lock shell 11. The blocking assembly 13 is provided with the sliding groove 133. The compression assembly 16 presses against the sliding groove 133. In this case, when the blocking assembly 13 deflects under the impact force, the compression assembly 16 can provide a reverse compression force. In addition, a side of the compression member of the compression assembly 16 further presses against the lock shell 11, so as to provide support for the external impact force corresponding to the lock shell 11 and maintain the overall lock body 100 less prone to failure.

Further, in another specific embodiment provided in the present disclosure, the actuating assembly 14 includes: a motor body 146; and a shaft body 142 that selectively blocks the avoidance of the blocking assembly 13 under the driving of the motor body 146.

The motor body 146 includes a motor shaft 141, a shaft body 142 sleeved on the motor shaft 141, an elastic body 143 arranged between the motor shaft 141 and the shaft body 142, and a clamp pin 144 arranged on the motor shaft 141. The clamp pin 144 can rotate synchronously with the motor shaft 141 to compress the elastic body 143, so as to drive the shaft body 142 to move. When the motor shaft 141 is fed and rotates, the clamp pin 144 is driven to rotate and compress the elastic body 143 on a side facing the blocking assembly 13, so as to drive the shaft body 142 to move towards the blocking assembly 13. When the motor shaft 141 retracts and rotates, the clamp pin 144 is driven to rotate and compress the elastic body 143 on a side away from the blocking assembly 13, so as to drive the shaft body 142 to move away from the blocking assembly 13 and allow the avoidance of the blocking assembly 13.

Further, in another specific embodiment provided in the present disclosure, the actuating assembly 14 includes: an electromagnetic field body 147; and a core body 145 that selectively blocks the avoidance of the blocking assembly 13 under the driving of the electromagnetic field body 147.

The electromagnetic field body 147 includes a magnet, a wound coil, and a core body 145 that is magnetized under the energized wound coil and interacts with the magnet in a magnetic field. The core body 145 blocks the avoidance of the blocking assembly 13 when not magnetized. After magnetized in the electromagnetic field, the core body retreats under the action of the magnet to facilitate the avoidance of the blocking assembly 13.

It can be understood that the anti-impact rotating tongue 12 type lock body 100 here is a product that can be sold alone compared to the anti-impact rotating tongue type storage device. Alternatively, the anti-impact rotating tongue type storage device is a highly integrated product. The anti-impact rotating tongue 12 type lock body 100 is a lowly integrated product or a main accessory that provides anti-impact performance.

It should be noted that the terms "include", "comprise", or any variants thereof are intended to cover a non-exclusive inclusion. As such, a process, method, commodity, or device including a series of elements not only includes these elements, but also includes other elements not definitely listed, or further includes inherent elements of the process, method, commodity, or device. In the absence of more limitations, an element defined by a statement "include a . . . " does not exclude other same elements existing in the process, method, commodity, or device including the element.

Described above are merely embodiments of the present disclosure, and the present disclosure is not limited thereto. Various modifications and variations may be made to the present disclosure for those skilled in the art. Any modification, equivalent substitution, improvement or the like made within the spirit and principle of the present disclosure shall fall into the scope of the claims of the present disclosure.

What is claimed is:

1. An anti-impact rotating tongue type storage device, comprising:

a box body;

a locking mechanism arranged in the box body; and a lock body that selectively cooperates with or separates from the locking mechanism, wherein the lock body comprises:

a lock shell that remains stationary relative to the locking mechanism in a working state;

a rotating tongue that selectively cooperates with or separates from the locking mechanism and rotates relative to the lock shell;

a blocking assembly that selectively blocks or avoids the rotating tongue within a rotation travel of the rotating tongue;

an actuating assembly that selectively blocks the avoidance of the blocking assembly at a first position within an avoidance travel of the blocking assembly; and a falling block assembly arranged at a second position different from the first position within the avoidance travel of the blocking assembly, that supplements a blocking function of the actuating assembly when the lock shell is subjected to an impact force: wherein the falling block assembly comprises a head, a rod portion extending from the head, and a reset member that surrounds the rod portion and presses against the head.

2. The anti-impact rotating tongue type storage device according to claim 1, wherein the blocking assembly has an end surface facing the rod portion;

the end surface is inclined relative to the rod portion; and when the head moves towards the blocking assembly, a distance between the rod portion and the end surface is reduced.

3. The anti-impact rotating tongue type storage device according to claim 1, wherein the falling block assembly is distributed on a first side of the blocking assembly; and the actuating assembly is distributed on an opposite side, opposite to the first side, of the blocking assembly.

4. The anti-impact rotating tongue type storage device according to claim 1, wherein an angle from the rod portion to the blocking assembly is greater than 90 degrees.

5. The anti-impact rotating tongue type storage device according to claim 1, wherein a side of the rotating tongue is buckled inwards in an arc shape to form a hook portion;

an arc-shaped groove is formed on a side of the hook portion, and the hook portion is provided with an opposite side, opposite to the arc-shaped groove, to form an unloading surface facing the blocking assembly; and the blocking assembly is provided with a lap surface corresponding to the unloading surface.

6. The anti-impact rotating tongue type storage device according to claim 1, wherein the lock body further comprises a compression assembly;

the blocking assembly is provided with a sliding groove; and the compression assembly presses against the sliding groove.

7. The anti-impact rotating tongue type storage device according to claim 1, wherein the actuating assembly comprises:

a motor body; and a shaft body that selectively blocks the avoidance of the blocking assembly under the driving of the motor body.

8. The anti-impact rotating tongue type storage device according to claim 1, wherein the actuating assembly comprises:

an electromagnetic field body; and a core body that selectively blocks the avoidance of the blocking assembly under the driving of the electromagnetic field body.

9. An anti-impact rotating tongue type lock body, comprising:

a lock shell;

a rotating tongue that rotates relative to the lock shell;

a blocking assembly that selectively blocks or avoids the rotating tongue within a rotation travel of the rotating tongue;

an actuating assembly that selectively blocks the avoidance of the blocking assembly at a first position within an avoidance travel of the blocking assembly; and a falling block assembly arranged at a second position different from the first position within the avoidance travel of the blocking assembly, that supplements a blocking function of the actuating assembly when the lock shell is subjected to an impact force: wherein the falling block assembly comprises a head, a rod portion extending from the head, and a reset member that surrounds the rod portion and presses against the head.

10. The anti-impact rotating tongue type lock body according to claim 9, wherein the blocking assembly has an end surface facing the rod portion;

the end surface is inclined relative to the rod portion; and when the head moves towards the blocking assembly, a distance between the rod portion and the end surface is reduced.

11. The anti-impact rotating tongue type lock body according to claim 9, wherein the falling block assembly is distributed on a first side of the blocking assembly; and the actuating assembly is distributed on an opposite side, opposite to the first side, of the blocking assembly.

12. The anti-impact rotating tongue type lock body according to claim 9, wherein an angle from the rod portion to the blocking assembly is greater than 90 degrees.

13. The anti-impact rotating tongue type lock body according to claim 9, wherein a side of the rotating tongue is buckled inwards in an arc shape to form a hook portion;

an arc-shaped groove is formed on a side of the hook portion, and the hook portion is provided with an opposite side, opposite to the arc-shaped groove, to form an unloading surface facing the blocking assembly; and the blocking assembly is provided with a lap surface corresponding to the unloading surface.

14. The anti-impact rotating tongue type lock body according to claim 9, wherein the lock body further comprises a compression assembly;

the blocking assembly is provided with a sliding groove; and the compression assembly presses against the sliding groove.

15. The anti-impact rotating tongue type lock body according to claim 9, wherein the actuating assembly comprises:

a motor body; and a shaft body that selectively blocks the avoidance of the blocking assembly under the driving of the motor body.

16. The anti-impact rotating tongue type lock body according to claim 9, wherein the actuating assembly comprises:

an electromagnetic field body; and a core body that selectively blocks the avoidance of the blocking assembly under the driving of the electromagnetic field body.

* * * * *